United States Patent
Blinzer

(10) Patent No.: US 12,443,358 B2
(45) Date of Patent: Oct. 14, 2025

(54) SYSTEM AND METHOD FOR TRANSFERRING DATA FROM NON-VOLATILE MEMORY TO A PROCESS ACCELERATOR

(71) Applicant: ADVANCED MICRO DEVICES, INC., Santa Clara, CA (US)

(72) Inventor: Paul Blinzer, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/360,996

(22) Filed: Jun. 28, 2021

(65) Prior Publication Data

US 2022/0413732 A1 Dec. 29, 2022

(51) Int. Cl.
G06F 3/06 (2006.01)
G06N 20/00 (2019.01)

(52) U.S. Cl.
CPC .......... *G06F 3/0647* (2013.01); *G06F 3/0604* (2013.01); *G06F 3/0635* (2013.01); *G06F 3/0659* (2013.01); *G06F 3/067* (2013.01); *G06F 3/0689* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,216,419 B2* | 2/2019 | De | G06F 3/0685 |
| 10,698,854 B1* | 6/2020 | Weishaupt | G06F 13/4068 |
| 10,761,736 B2 | 9/2020 | Osqueizadeh et al. | |
| 2006/0106749 A1* | 5/2006 | Ganfield | G06F 16/9024 |
| 2009/0249356 A1* | 10/2009 | He | G06F 9/546 |
| | | | 719/314 |
| 2011/0161675 A1* | 6/2011 | Diard | G06F 21/72 |
| | | | 713/189 |
| 2011/0292058 A1 | 12/2011 | Herr et al. | |
| 2013/0086315 A1* | 4/2013 | Kim | G06F 11/1441 |
| | | | 710/308 |
| 2014/0129753 A1 | 5/2014 | Schuette et al. | |
| 2015/0350301 A1* | 12/2015 | Yokoi | G06F 3/06 |
| | | | 709/212 |
| 2017/0091981 A1* | 3/2017 | Herr | G06T 15/005 |
| 2019/0005606 A1* | 1/2019 | Yang | G05D 1/0088 |

(Continued)

OTHER PUBLICATIONS

Ravi et al (Ravi, J., GPU Direct I/O with HDF5, Lawrence Berkeley National Laboratory, Nov. 1, 2020) (Year: 2020).*

(Continued)

*Primary Examiner* — Arpan P. Savla
*Assistant Examiner* — Edmund H Kwong

(57) ABSTRACT

Methods and apparatuses for transferring data from non-volatile memory to process accelerator memory are disclosed. In one embodiment, a process accelerator issues a transfer request for a resource at a host file system. The process accelerator receives, responsive to the transfer request, data from the host file system, wherein the data corresponds to the resource and the process accelerator receives the data directly from the host file system bypassing staging memory of the host. The process accelerator manipulates the data to obtain the resource. Thus, the process accelerator may obtain the resource directly from the host file system to minimize the number of transfers of the data.

17 Claims, 7 Drawing Sheets

(56) References Cited

U.S. PATENT DOCUMENTS

2021/0117333 A1\* 4/2021 Qureshi .............. G06F 12/1009
2021/0132858 A1\* 5/2021 Kamran ................. G06F 3/061

OTHER PUBLICATIONS

Bayati et al (Exploiting GPU Direct Access to Non-Volatile Memory to Accelerate Big Data Processing, Nov. 2020) (Year: 2020).\*
Thompson et al., Nvidia Developer, GPUDirect Storage: A Direct Path Between Storage and GPU Memory, Aug. 2019 (Year: 2019).\*
Andrew Yeung, DirectStorage is coming to PC, Microsoft, DirectX Developer Blog, URL: https://devblogs.microsoft.com/directx/directstorage-is-coming-to-pc/, dated Sep. 1, 2020, 9 pages.
Microsoft, File systems driver design guide, Windows drivers, Microsoft docs, URL: https://docs.microsoft.com/en-us/windows-hardware/drivers/ifs/, dated Sep. 10, 2020, 3 pages.
Microsoft, IoGetIommuInterface function (wdm.h), Windows drivers, Microsoft Docs, URL: https://docs.microsoft.com/en-us/windows-hardware/drivers/ddi/wdm/nf-wdm-iogetiommuinterface, dated Oct. 19, 2018, 2 pages.
Microsoft, microsoft / Windows-driver-samples, URL: https://github.com/microsoft/Windows-driver-samples/tree/master/filesys, dated Sep. 24, 2019, printed Mar. 5, 2021, 1 page.
International Search Report and Written Opinion, PCT/US2022/035128, Sep. 30, 2022, 9 pages.

\* cited by examiner

SYSTEM AND METHOD FOR TRANSFERRING DATA FROM NON-VOLATILE MEMORY TO A PROCESS ACCELERATOR

BACKGROUND

General purpose processors are used in a computing system to perform a wide variety of computations including complex computations. However, other tasks such as graphics acceleration or machine learning require a lot of simple computations that can be computed in parallel. These tasks may be inefficient when executed on a general-purpose processor. Modern computers may have additional process accelerators to accelerate processes and computations that are inefficient on general purpose processors. For example, a graphics accelerator may perform a large number of computations in parallel using specialized cores, or a machine learning process accelerator may be designed to perform matrix multiplication efficiently. Process accelerators in a typical computer system may have their own, local high bandwidth memory separate from system memory. Before data can be processed by the process accelerator, the computing system needs to transfer the data from non-volatile memory (NVM) of which NVM Express® (NVMe®) is an example, to system memory for staging, and then to memory to the local high bandwidth memory of the process accelerator.

DETAILED DESCRIPTION

Figure 1:
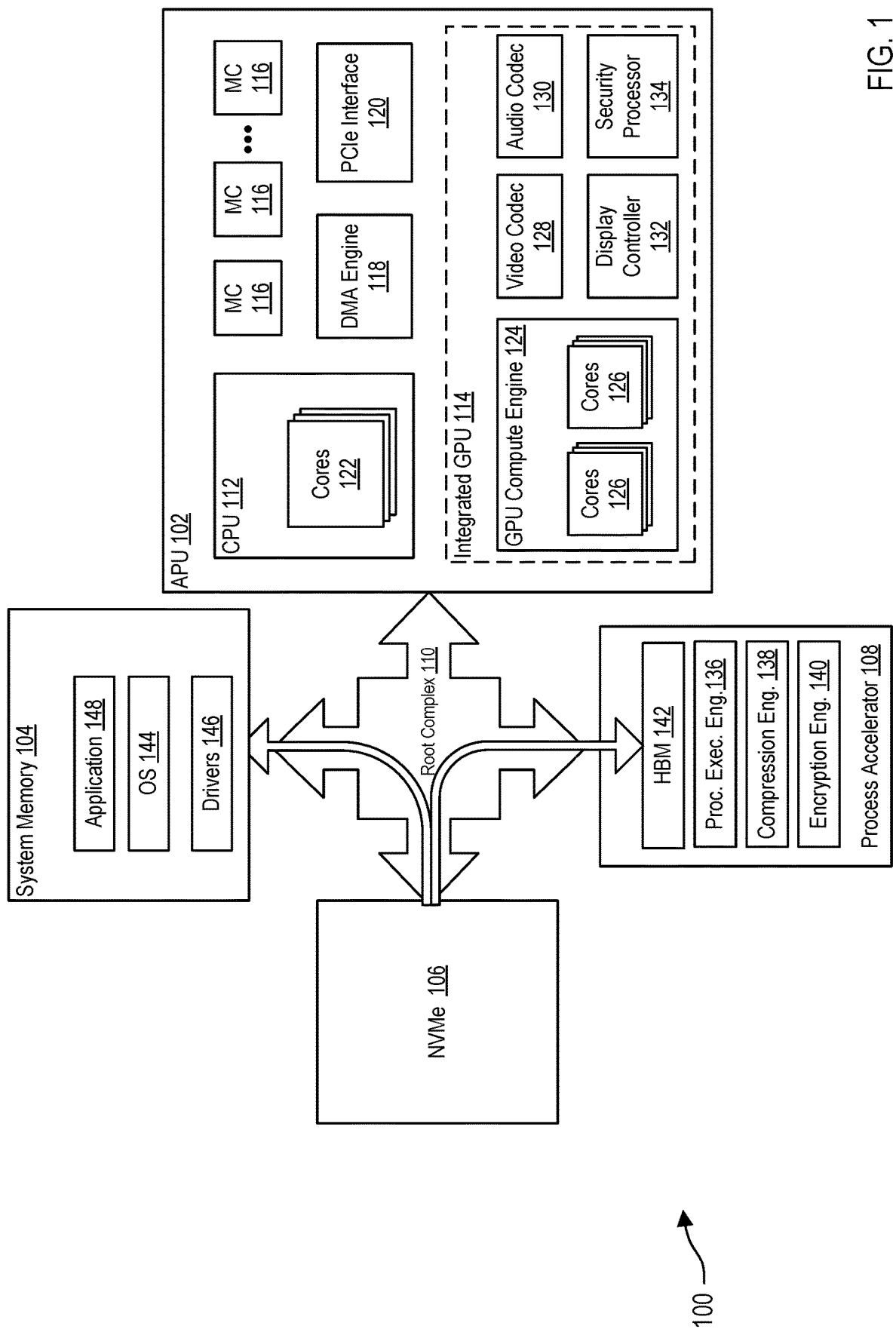
FIG. 1 sets forth a block diagram of an example computing system for transferring data from NVM to high bandwidth memory of a process accelerator.

In some embodiments, a method for transferring data from non-volatile memory to process accelerator memory: issuing, by a process accelerator, a transfer request for a resource at a host file system; receiving, by the process accelerator responsive to the transfer request, data from the host file system, wherein the data corresponds to the resource and the process accelerator receives the data directly from the host file system bypassing staging memory of the host; and manipulating, by the process accelerator, the data to obtain the resource.

In some embodiments, the transfer request comprises location data for accessing the data, size data indicating a transfer size of the data, compression data indicating a compression type of the data, and target data indicating a target resource of the process accelerator. In some embodiments, the process accelerator is one of a graphics accelerator or a machine learning accelerator. In some embodiments, the data is at least one of an encrypted form of the resource, a compressed form of the resource, or a tile form of the resource.

In some embodiments, manipulating the data to obtain the resource comprises at least one of decompressing the data, decrypting the data, or tiling the data.

In some embodiments, the process accelerator receives the data from the host file system by way of a direct memory transfer.

In some embodiments, the transfer request is issued to a dispatch queue of the host system.

In some embodiments, the host file system is a redundant array of independent disks.

In some embodiments, an apparatus for transferring data from non-volatile memory to process accelerator memory is configured to perform steps including: issuing, by a process accelerator, a transfer request for a resource at a host file system; receiving, by the process accelerator responsive to the transfer request, data from the host file system, wherein the data corresponds to the resource and the process accelerator receives the data directly from the host file system bypassing staging memory of the host; and manipulating, by the process accelerator, the data to obtain the resource.

In some embodiments, the transfer request comprises location data for accessing the data, size data indicating a transfer size of the data, compression data indicating a compression type of the data, and target data indicating a target resource of the process accelerator. In some embodiments, the process accelerator is one of a graphics accelerator or a machine learning accelerator. In some embodiments, the data is at least one of an encrypted form of the resource, a compressed form of the resource, or a tile form of the resource.

In some embodiments, manipulating the data to obtain the resource comprises at least one of decompressing the data, decrypting the data, or tiling the data.

In some embodiments, the process accelerator receives the data from the host file system by way of a direct memory transfer.

In some embodiments, the transfer request is issued to a dispatch queue of the host system.

In some embodiments, the host file system is a redundant array of independent disks.

In some embodiments, a computer program product disposed upon a non-transitory computer readable medium includes computer program instructions for transferring data from non-volatile memory to process accelerator memory that, when executed, cause a computer system to perform steps including: issuing, by a process accelerator, a transfer request for a resource at a host file system; receiving, by the process accelerator responsive to the transfer request, data from the host file system, wherein the data corresponds to the resource and the process accelerator receives the data directly from the host file system bypassing staging memory of the host; and manipulating, by the process accelerator, the data to obtain the resource.

In some embodiments, the transfer request comprises location data for accessing the data, size data indicating a transfer size of the data, compression data indicating a compression type of the data, and target data indicating a target resource of the process accelerator. In some embodiments, the process accelerator is one of a graphics accelerator or a machine learning accelerator. In some embodiments, the data is at least one of an encrypted form of the resource, a compressed form of the resource, or a tile form of the resource.

In some embodiments, manipulating the data to obtain the resource comprises at least one of decompressing the data, decrypting the data, or tiling the data.

In some embodiments, the process accelerator receives the data from the host file system by way of a direct memory transfer.

In some embodiments, the transfer request is issued to a dispatch queue of the host system.

In some embodiments, the host file system is a redundant array of independent disks.

Embodiments in accordance with the present disclosure will be described in further detail beginning with FIG. 1. Like reference numerals refer to like elements throughout the specification and drawings. FIG. 1 sets forth a block diagram of a non-limiting example system 100 for transferring data in accordance with some embodiments of the present disclosure. The example system 100 can be implemented as a variety of computing devices, including personal computers, gaming consoles, smart phones, mobile devices, workstation computers, server computers, and the like. The example system 100 includes a processor 102, system memory 104, non-volatile memory 106 (NVM) of which NVM Express® (NVMe®) is an example, a process accelerator 108, and a root complex 110 interconnecting the processor 102, the system memory 104, the NVM 106, and the process accelerator 108. The components shown are illustrative and other components may also be connected to or be in communication with the computing system 100.

In the example system 100 of FIG. 1, the processor 102 is an accelerated processing unit (APU) that integrates a central processing unit (CPU) 112 and an integrated graphics processing unit (iGPU) 114 (referred to herein as an "integrated GPU"). The CPU 112 and the integrated GPU 114 may be implemented on the same chip and thus may share a number of components and interfaces such as system memory 104, memory controllers 116 and direct memory addressing (DMA) engines 118 for accessing system memory 104, bus interfaces such as a personal computing interface express (PCIe) interface 120, and other interfaces and adapters not depicted in FIG. 1 such as a network interface, universal serial bus (USB) interface, persistent storage interface such as hard disk drive (HDD) and solid state drive (SSD) interface, and so on. The CPU 112 includes one or more cores 122 (i.e., execution engines), cache structures (not shown), pipeline components (also not shown), and so on. The CPU 112 and other shared components are connected to the GPU 114 via a high-speed on-chip communications fabric (not shown). In other examples, the processor 102 may have less than all of the components illustrated in FIG. 1. For example, the processor 102 may be implemented without the integrated GPU 114.

In the example system 100 of FIG. 1, the integrated GPU 114 includes a GPU compute engine 124 that includes multiple single instruction multiple data (SIMD) processing cores 126 having many parallel processing units (not shown). The GPU compute engine 124 also includes other components not depicted in FIG. 1 such as geometry processors, rasterizers, graphic command processors, hardware schedulers, asynchronous compute engines, caches, data shares, and so on. In the example of FIG. 1, the integrated GPU 114 also includes hardware accelerators in the form of application specific integrated circuits or functional logic blocks such as a video encoder/decoder 128 (i.e., a "codec") for accelerated video encoding and decoding, an audio codec 130 for accelerated audio encoding and decoding, a display controller 132 for accelerated display processing, and a security processor 134 for accelerated security protocol enforcement and compliance.

In the example system 100 of FIG. 1, the processor 102 communicates with a process accelerator 108 over the root complex 110. The root complex 110 may comprise a plurality of peripheral connect interface express (PCIe) interfaces or a compute express link (CXL) communicatively coupling the processor 102, the process accelerator 108, the system memory 104, and the NVM 106. In some examples, the processor 102 and the process accelerator 108 may be implemented on the same substrate (e.g., a printed circuit board). In other examples, the process accelerator 108 is implemented on video or graphics card that is separate from the substrate of the processor 102.

The process accelerator 108 in the example of FIG. 1 includes a process execution engine 136 that may include multiple SIMD processing cores having many parallel processing units (not shown). The process execution engine 136 may also include other components not depicted in FIG. 1 such as memory controllers, DMA engines, machine learning processors, geometry processors, rasterizers, graphic command processors, hardware schedulers, asynchronous compute engines, caches, data shares, and so on depending on the functionality of the process accelerator 108. In the example of FIG. 1, the process accelerator 108 also includes hardware accelerators in the form of application specific integrated circuits or functional logic blocks such as a compression engine 138 for accelerating the decompression and/or the compression of data and an encryption engine 140 for accelerating the decryption and/or encryption of data. The process accelerator 108 also includes high bandwidth memory (HBM) 142.

In the example system 100 of FIG. 1, the system memory 104 (e.g., dynamic random access memory (DRAM)) hosts an operating system 144 that interfaces with device drivers 146 for the processor resources (i.e., the APU and discrete GPU and their constituent components) described above. The system memory 104 also hosts one or more applications 148. Pertinent to this disclosure, the one or more applications may be graphics applications, multimedia applications, video editing applications, high performance computing applications, machine learning applications, or other applications that that require the transfer of large amounts of data from the NVM 106 to the process accelerator 108. The one or more applications 148 generate workloads (e.g., graphics rendering workloads, audio/video transposing workload, media playback workload, machine learning workloads, etc.) that are allocated to the process accelerator 108 by a call to the operating system 144. Readers of skill in the art will appreciate that the one or more applications may be variety of additional application types generating a variety of workload types, not all of which are identified here. However, the specific mention of application types and workload types within the present disclosure should not be construed as limiting application types and workload types to those that are identified here.

Figure 2:
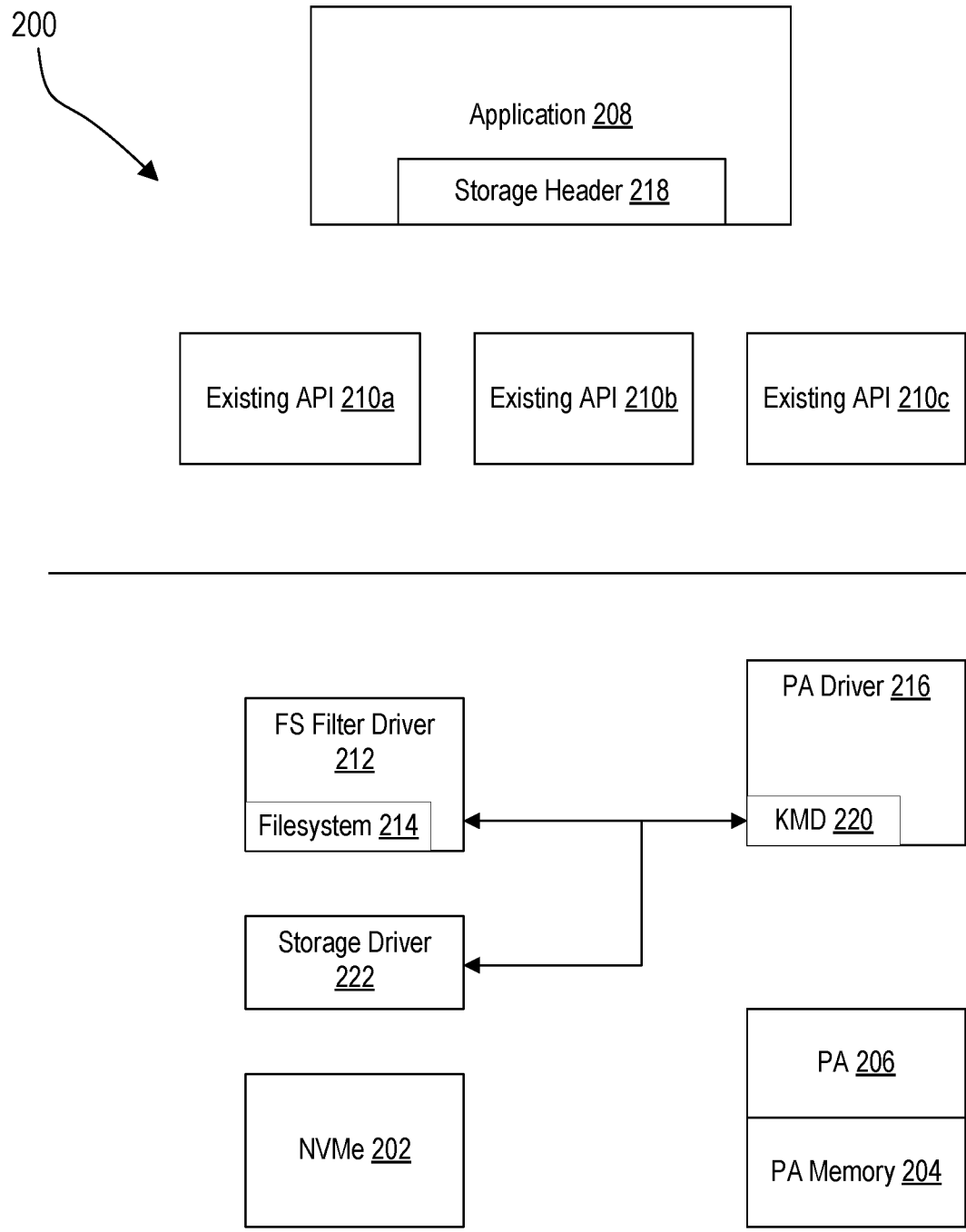
FIG. 2 sets forth a software component block diagram illustrating software components for transferring data from NVM storage to process accelerator memory of a process accelerator.

For further explanation, FIG. 2 sets forth a software component block diagram 200 illustrating software components for transferring data from NVM storage 202 such as NVM 106 of FIG. 1 to process accelerator memory 204 of a process accelerator 206 such as process accelerator 108 of FIG. 1. The software components include an application 208, existing APIs 210a, 210b, and 210c (collectively 210), a file system filter 212, a file system 214, a process accelerator driver 216, a kernel mode driver 220, and a storage system driver 222.

Embodiments in accordance with the present disclosure can use existing API infrastructures and ecosystems such that specific OS enablement for transferring data from the NVM storage 202 to the process accelerator 206 is not required. For example, the application 208 can request data to transfer to the process accelerator memory 204 using existing calls and parameters with the addition of a process accelerator specific storage header 218 to the existing calls. For example, an application 208 that uses a storage API such as Microsoft DirectStorage can alternatively use embodiments of the present disclosure to transfer data from the NVM storage 202 to the process accelerator memory 204. Thus, an application 208 is able to use existing APIs 210 or embodiments of the present disclosure depending on hardware support. The storage header 218 facilitates a direct memory access (DMA) transfer from the from the NVM to the process accelerator memory 204 without additional work on the part of an independent software vendor (ISV). For example, application 208 may initiate the transfer of data from the NVM storage 202 to the process accelerator memory 204 without any additional programming by an ISV using the described embodiments.

Embodiments in accordance with the present disclosure can use a user space library built on a concept of a dispatch queue that contains transfer requests, status requests, signaling event dispatches, etc. This user space library may be consistent with existing user space library functions and calls such that the user space library can be substituted for an existing user space library. In a user space library in accordance with examples of the present disclosure, each storage transfer request can be placed into a queue by calling functions such as EnqueueRequest( ), EnqueueStatus( ), EnqueueSignal( ) of an object interface. These requests can then can be dispatched by a Submit( ) member function to be executed by the infrastructure, or if the queue size is exceeded by the number of queued requests—an autosubmit can triggered by the interface library itself. Additionally, other functions can manage the queue such as methods for canceling a pending request (CancelRequestsWithTag( )) and several other helper interface methods to retrieve error information, query status info and creating, destroying, sizing the queue itself and some ancillary staging buffers in a stateful manner. There may also be similar management functions for thread affinity and similar. However, in general, the flow of the data in the queue enqueues the transfer requests asynchronously. The application 208 can track progress of the transfer requests by leveraging the COM object methods to query status and identify when the transfer requests are completed.

The EnqueueRequest( ) can have several parameter fields that indicate the source of the data (either file system or memory, with a value specifying offset or virtual address), the transfer size, compression format (or being uncompressed), and the destination, which can be either memory, an unstructured buffer resource, a texture resource or a tiled resource. Of note is that the EnqueueRequest( ) contains all needed data to unambiguously identify source and target, and does not reference the COM internal state to the application level outside of the very limited status query functions. Also of note is the use of a C++ virtual function definition for the public interface functions in the COM object and therefore allow software in principle to use object inheritance to overload the interface functions with specific functions in accordance with the present disclosure.

Figure 3:
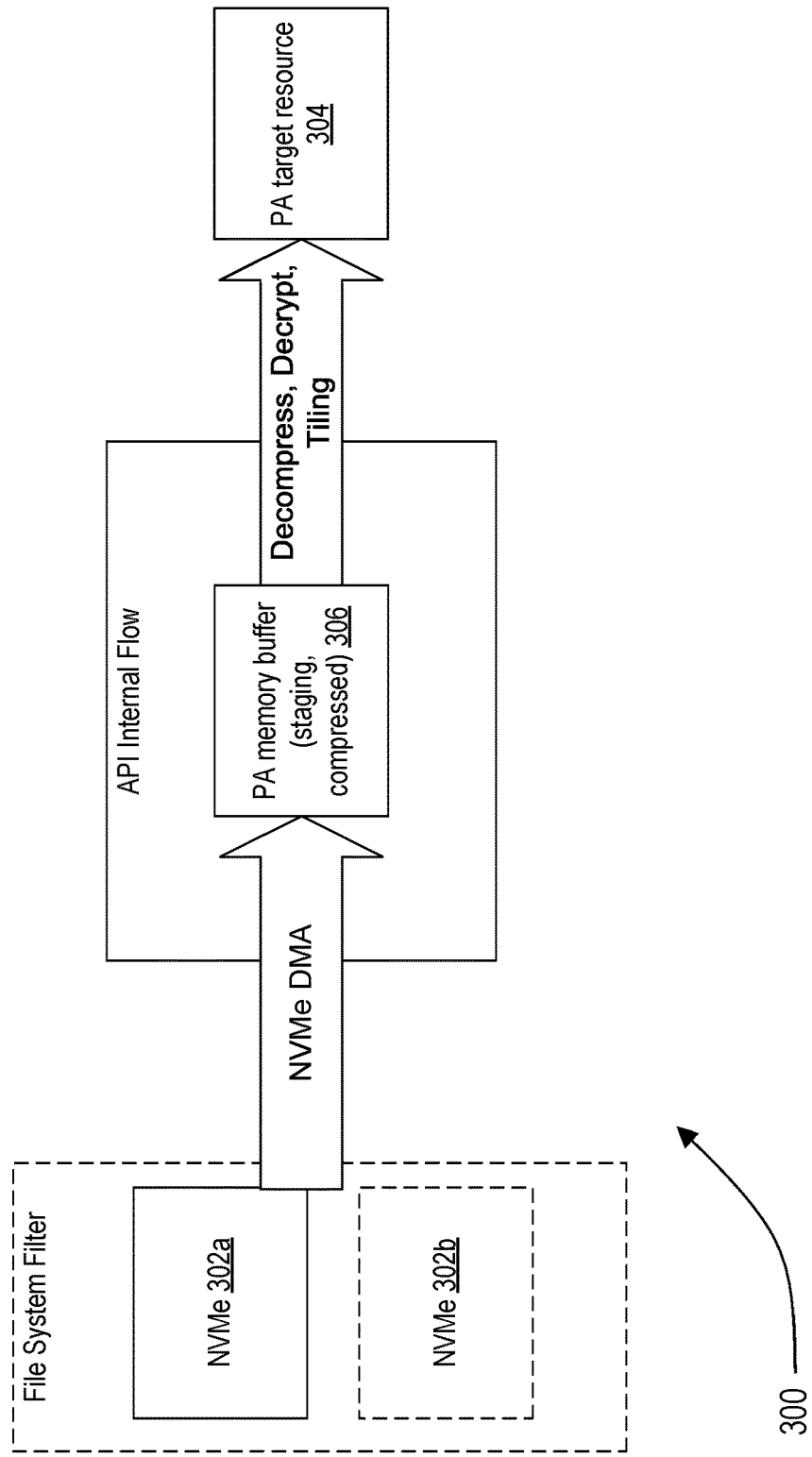
FIG. 3 sets forth a data flow diagram that shows the path of data as it flows from an NVM to process accelerator memory.

For further explanation, FIG. 3 sets forth a data flow diagram 300 that shows the path of data as it flows from an NVM 302a, 302b (collectively 302) to a process accelerator to obtain a target resource 304 for the process accelerator. While FIG. 3 illustrates an example having two NVM 302 storage devices, more or less storage devices are possible. Embodiments in accordance with the present disclosure utilize smart access memory (SMA) to directly transfer data from the NVM (which may be a RAID configuration using multiple NVM drives) to the process accelerator memory buffer 306. The process accelerator may perform any necessary staging, decompression, and/or decryption as required to obtain the process accelerator target resource 304. As shown in FIG. 3, no staging is necessary in system memory since the data is transferred directly to the process accelerator from the NVM using DMA. Embodiments in accordance with the present disclosure do not require the data to pass through system memory since the compression, decryption, and/or other processing is done directly on the process accelerator. A transfer request using the storage header 218 of FIG. 2 may contain at least one entry with all the necessary information to complete the transfer including the input file handle and offset (or a system memory pointer), the transfer size, the compression format, the target resource process accelerator handle, and the type of target resource.

Figure 4:
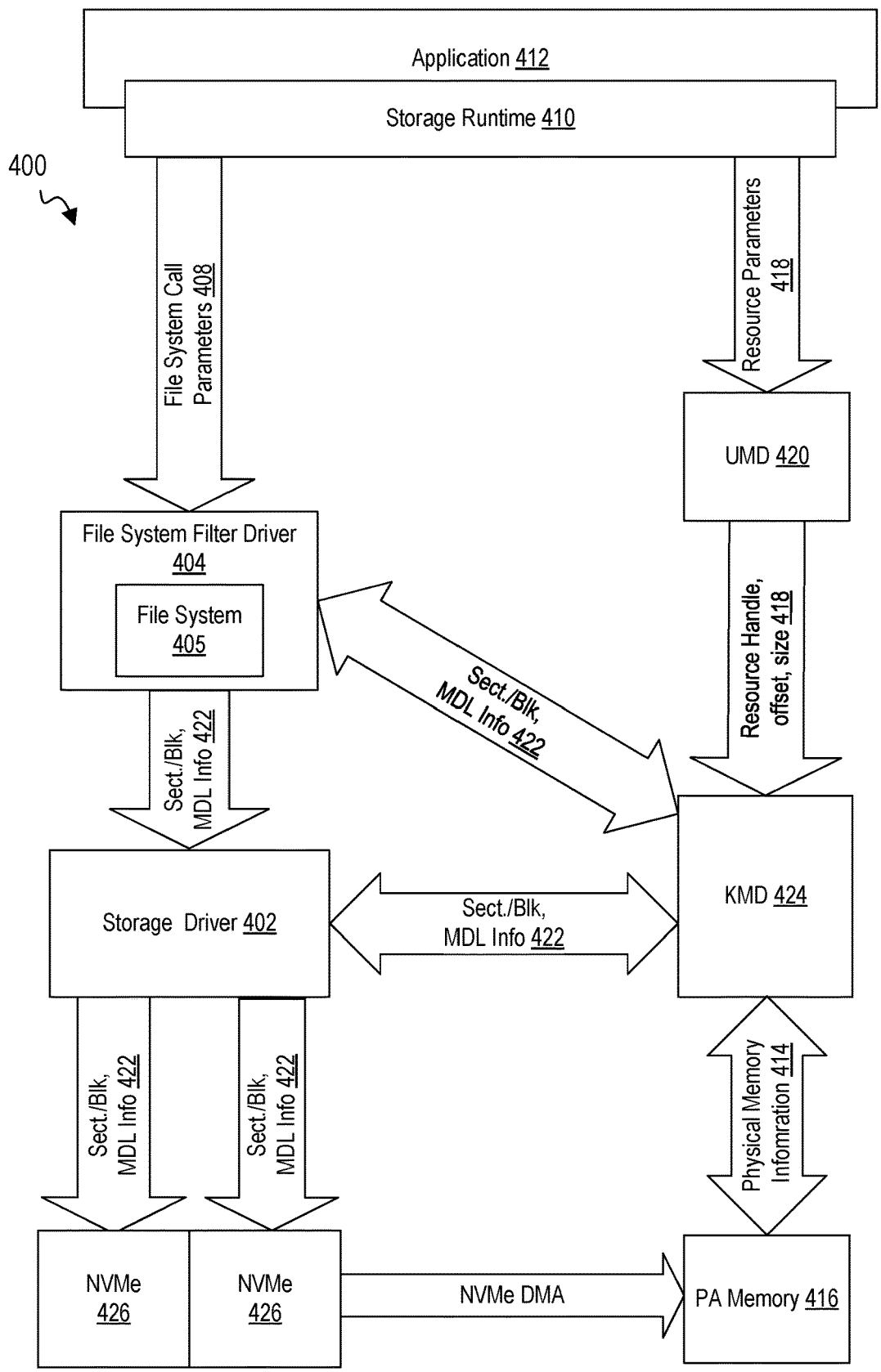
FIG. 4 sets forth a diagram of a high-level design of a storage driver and a file system filter driver in a storage stack according to some embodiments.

For further explanation, FIG. 4 sets forth an example of a high-level design 400 of a storage driver 402 and a file system filter driver 404 in a storage stack. In use, an application 412 requests a resource from the file system 405 utilizing a storage runtime 410. The storage runtime 410 issues file system call parameters 408 to the file system filter driver 404 and sends resource parameters 418 to a user mode driver 420. The file system filter driver 404 maps the file system call parameters 408 to sector/block numbers 422 or other physical drive parameters and a memory descriptor list (MDL) for the NVM 426 as translated by the storage driver 402. In some examples, the storage driver 402 may be a RAID driver accessing multiple NVM drives 426. The file system filter driver 404 further interfaces with a kernel mode driver 424 to retrieve staging buffer physical memory information 414 of the process accelerator memory 416. The buffer physical memory information 414 is mapped to the sector/block numbers 422 as translated by the storage drive from the file system call. In some examples, in which existing storage APIs map a system memory buffer to the sector/block numbers 422, the process accelerator memory 416 may alias the system memory allowing the NVM drive to directly write the data to the GPU memory transparently to the application 412.

The kernel mode driver 424 is configured to identify the target memory address in the process accelerator memory 416 and provide the physical memory information 414 to the file system filter driver 404 and the storage driver 402. These drivers can then map the DMA target physical address in the process accelerator memory 416.

Figure 5:
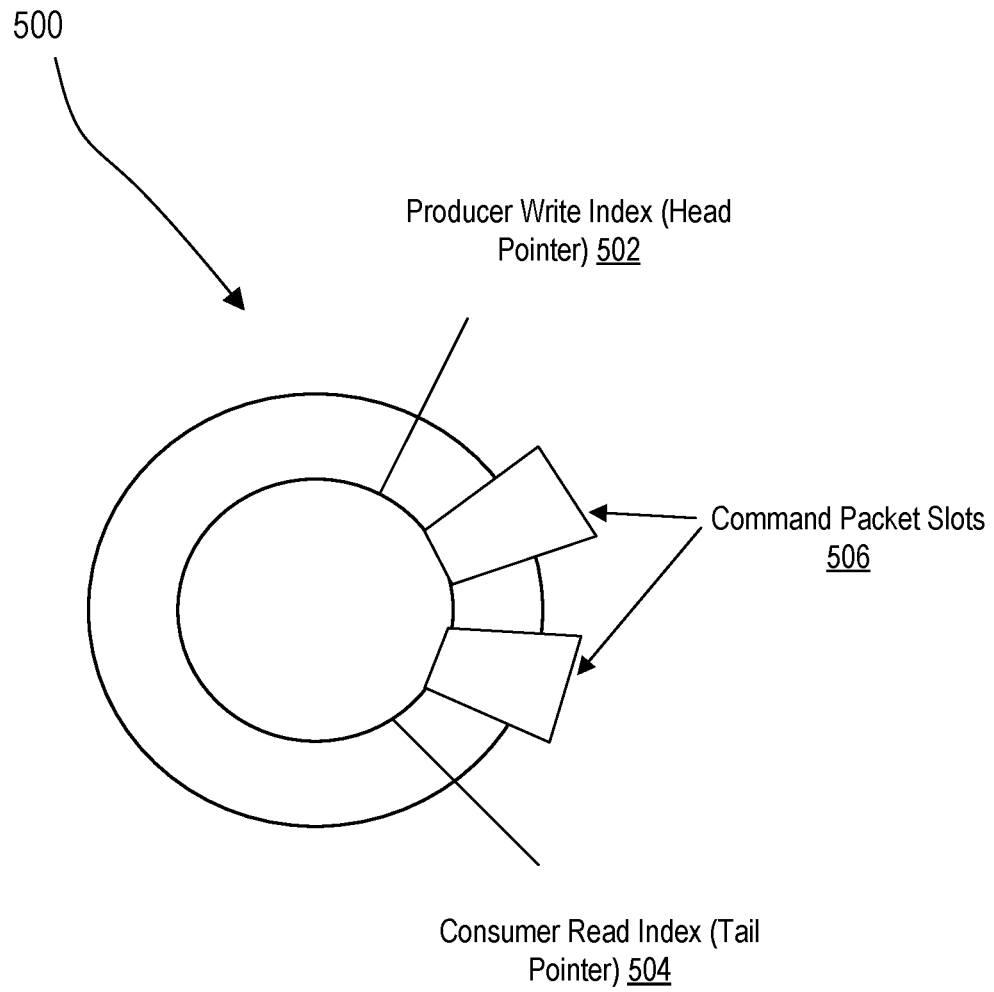
FIG. 5 sets forth a diagram of a dispatch queue according to some embodiments.

For further explanation, FIG. 5 sets forth an example diagram of a dispatch queue 500 in accordance with some embodiments of the present disclosure. The dispatch queue 500 provides a communication interface between the file system filter driver 404, storage driver 402 and the kernel mode driver 424 and may be a lock-free dispatch queue with atomically incremented write and read indices (e.g. command producer allocates a slot via atomic CAS operation and increments head pointer 502 when dispatching a task, and command consumer increments a tail pointer 504 when command packet has been consumed). The dispatch queue 500 can be a wraparound aligned with a power-of-2 command queue size. Several command packet slots 506 may be located between the head pointer 502 and the tail pointer 504 that carry the payload information between the kernel mode driver 424 and the other drivers. Each of the drivers may have its own command queue infrastructure such as that illustrated in FIG. 5 so that the other components can dispatch requests to that can be discovered by a private driver interface.

The overall dispatch flow may follow the command queue model as follows:

The "caller/producer" allocates a command packet slot 506 to the dispatch queue by incrementing the write index head pointer 502.

The value of the write index (head pointer 502) before the increment operation is the ID of the command packet allocated.

The "caller/producer" assigns a packet to the dispatch queue 500 by changing a packet format field to set it from "undefined/empty" to "ready". All other packet data (parameters, etc.) may be written to memory and globally visible before this step.

When a "caller" assigns a packet to the "called", the ownership of the packet is transferred. The "called" may update the packet content if needed at any time after packet submission, and the submitting caller should not rely on the content of the packet thereafter.

The read index (or tail pointer 504) is only updated by the "called" to indicate when the command has been consumed. The "caller can assume that after the tail passes a queue slot, the operation has been consumed and is in progress, but may not be completed.

tions of the staging buffer. The user mode drivers may associate a 64 bit ID (atomically incremented) that uniquely identify a particular transfer request. When the storage stack has aligned and matched the parameters with its own data, it sends down the target MDL info (and NVM sector/block list) to the storage driver (with a RAID driver potentially modifying the alignment from the data provided by the file system filter driver). The storage drivers are then expected to execute the request from the layers above, the completion status is then surfaced up the stack and when reaching the infrastructure, issue a completion signal to the referenced location in the command packet to inform the KMD and any other observer that the entire transfer operation completed and the data is ready to be used in further driver calls.

Query Status: command packet allows the KMD to identify if a particular transfer is in progress and hardware resources have to be kept stable.

Initiate Device Power Down: Command packet indicates to storage stack that a direct memory access aperture may not be available due to the process accelerator being in a suspended state. The storage stack is expected to complete pending transfers. KMD may provide in command packet an alternate system memory location to DMA transfer to while the process accelerator is fully powered down. KMD is expected to transfer the system memory buffers into process accelerator memory resources before sending an "Initiate Device Power Up".

Initiate Device Power Up: Command packet indicates to storage drivers that DMA operations may resume and the mapping of the memory resource to process accelerator memory can resume.

A command packet may have the following parameters

```
struct_command {
    uint64 command; // may be 0 = "empty", or one of the enumerated values indicating the
command, needs to transition from 0 to command after all other parameters have been written
    union {
        handle fileID;
        void * src_memory;
    } input;
    uint64 input_offset; // would be used in fileID case, may be used as relative byte offset if
src is from memory, otherwise 0
    uint64 transfer_size; // self explanatory
    handle target_resource; // this is the allocated resource either in process accelerator
aperture memory or - in power down - in system memory
    void * target_mdl; // pointer to the Memory Descriptor List created by KMD
    uint64 * completion_status; // points to another location in memory that when observed
indicates if the transfer has fully completed and the data can be used by other commands
    uint64 Reserved;
} COMMAND_PACKET;
```

50

The command packet may reference a system memory location that is written to by the "called" to indicate the operation in the packet completed.

To allow lock free synchronization the drivers may use atomicOps on system memory for access to head pointer 502 and the tail pointer 504 and updating the packet to "ready".

The following commands may be supported by the kernel drivers:

Transfer Request: This may contain the parameters forwarded from user mode (see above) but in addition may add each of the driver's MDL for the physical memory location where either the input or the target memory location resides. It is the task of the file system filter or storage driver to retrieve the target resource data from the KMD of the target surface and alias/remap the physical memory target loca- For further explanation, FIG. 6 sets forth a flow chart illustrating an example method of transferring data from host file system 605 to process accelerator 601 memory according to embodiments of the present disclosure. The method of FIG. 6 includes issuing 602, by the process accelerator, a transfer request 603 for a resource stored at a host file system 605. Issuing a transfer request may be carried out by a process accelerator 601 of the host system 600. Referring to FIG. 1, an example may include an application executing on a process accelerator 601 of the host system 600 issuing a transfer request 603 using operating system resources by way of a storage driver, such as the application 148, operating system 144, and device drivers 146 of FIG. 1. In another example, referring to FIG. 4, the application 412 may request a resource from file system 405 stored at NVM 426 by way of storage runtime 410. The storage runtime 410 issues file system call parameters 408 including the input handle of the resource, the transfer size of the resource, a compression format of the resource, and a target handle for the resource, and a target resource type. The file system filter driver 404 may then convert the file system call parameters 408 to sector, block, and a media descriptor list which is then sent to the storage driver 402. The storage runtime 410 further sends resource parameters 418 including a resource handle, offset, and size of the resource to the user mode driver 420. The user mode driver 420 may interface with the kernel mode driver 424 to obtain the physical memory information of the process accelerator memory 416.

An example transfer request may comprise location data for accessing the data, size data indicating a transfer size of the data, compression data indicating a compression type for the data, and target data indicating a target resource of the process accelerator. For example, referring to FIG. 4, the transfer request can comprise file system call parameters 408 and the resource parameters 418. The file system call parameters 408 includes location data for accessing the data, size data indicating a transfer size of the data, compression data indicating a compression type of the data and, and target data indicating a target resource of the process accelerator. In some examples, the location data can include a file handle and an offset for the data and the resource parameters can comprise a resource handle, an offset, and a size for the resource. Thus, the location data identifies the data in the file system while the target data identifies where the resource will be located in the process accelerator memory.

Figure 6:
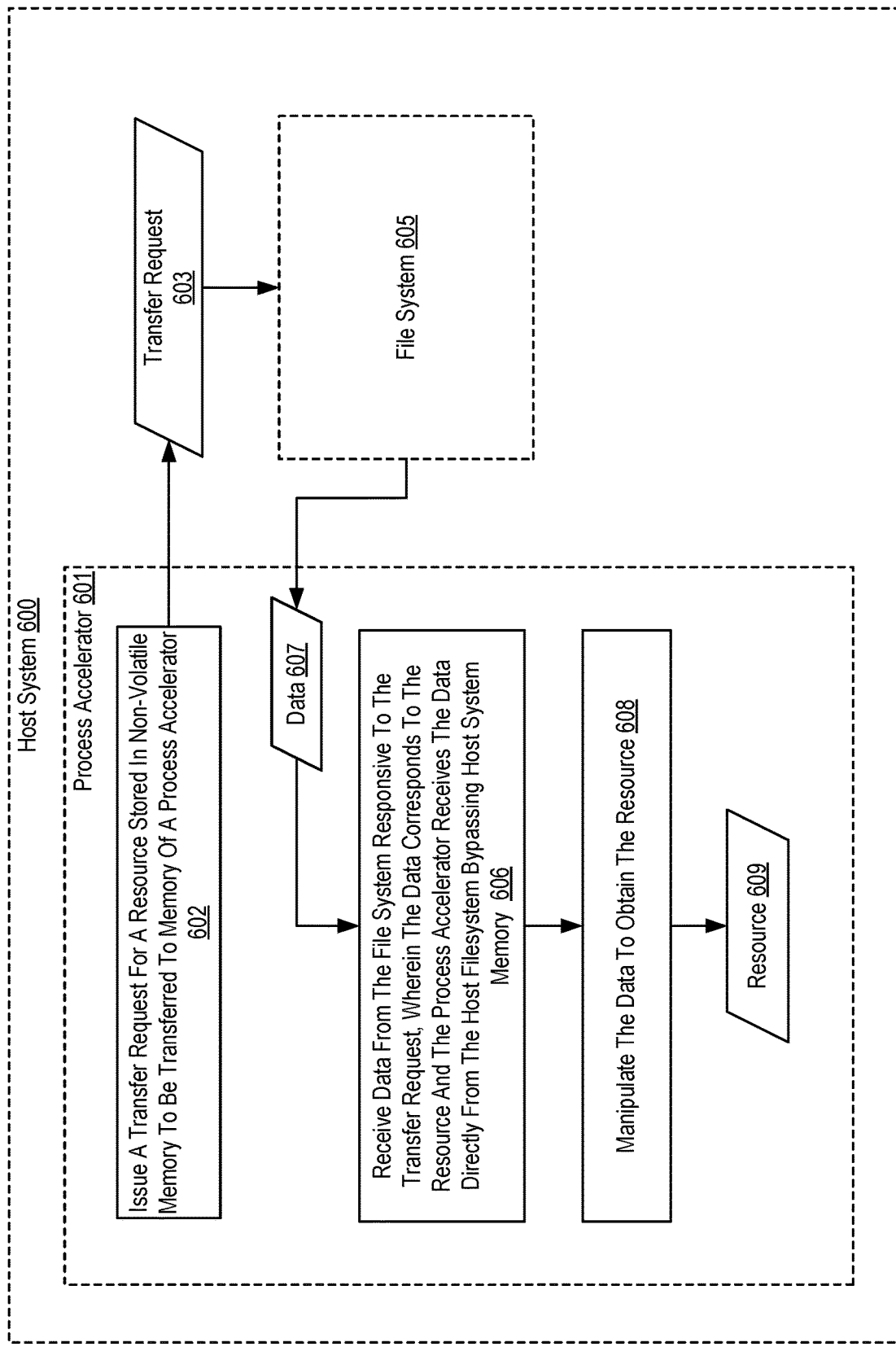
FIG. 6 sets forth a flow chart illustrating an example method of transferring data from non-volatile storage to process accelerator memory.

The method of FIG. 6 also includes receiving 606, by the process accelerator 601 responsive to the transfer request for the resource at the host file system, the data 607 from the file system 605, wherein the data 607 corresponds to the resource and the process accelerator 601 receives the data directly from the host file system 605 bypassing host system memory. Receiving 606 data from the file system 605 may be carried out by direct memory access (DMA) by the process accelerator 601 of a storage device storing the file system 605. Referring to FIG. 1, an example may include the process accelerator 108 receiving data by a DMA transfer from the NVM storage 106 to the process accelerator high bandwidth memory 142. In another example, referring now to FIG. 4, the NVM storage 426 may transfer data directly to the process accelerator memory 416 using DMA and a dispatch queue 500 as described in relation to FIG. 5.

The method of FIG. 6 also includes manipulating 608 the data 607 to obtain the resource 609. Manipulating 608 the data may be carried out by the process accelerator using a compute engine or other controller. Referring to FIG. 1, an example may include the process accelerator 108 manipulating the data to obtain the resource. The resource may be stored at the NVM 106 in a compressed and encrypted form. The process accelerator 108 may be configured to decompress the data using process execution engine 136 or compression engine 138 and decrypt the data using the process execution engine 136 or the encryption engine 140 to obtain the resource.

Figure 7:
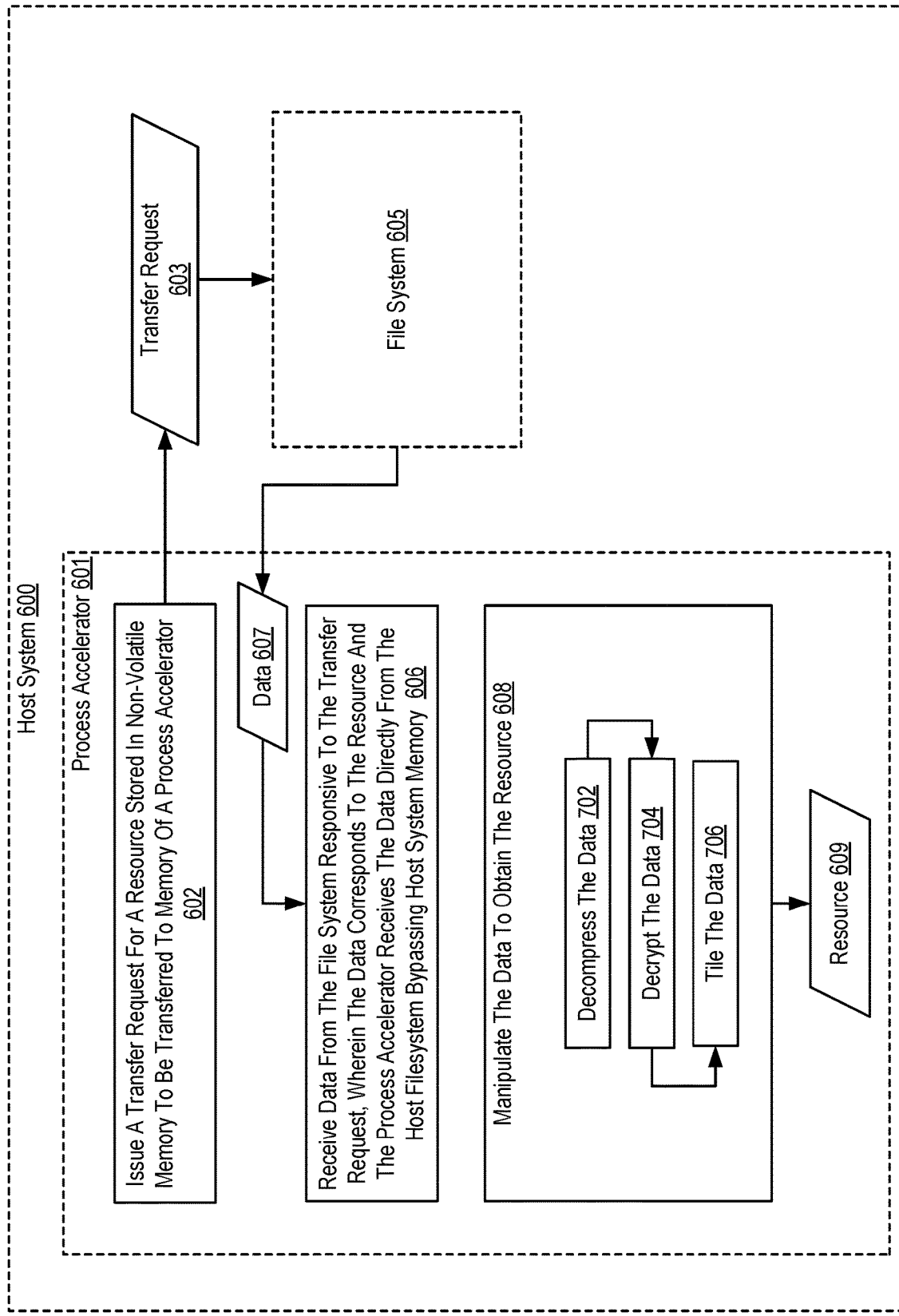
FIG. 7 sets forth a flow chart illustrating an example method of transferring data from non-volatile storage to process accelerator memory.

For further explanation, FIG. 7 sets forth a flow chart illustrating another example method of transferring data from the host file system 605 to process accelerator 601 memory according to embodiments of the present disclosure. The method of FIG. 7 is similar to the method of FIG. 6 in that the method of FIG. 7 also includes: issuing 602, by the process accelerator 601, a transfer request 603 for a resource stored at a host file system 605; receiving 606, by the process accelerator 601, the data 607 from the file system 605, wherein the data 607 corresponds to the resource and the process accelerator 601 receives the data directly from the host file system 605 bypassing host system memory; and manipulating 608 the data 607 to obtain the resource 609.

The method of FIG. 7 differs from the method of FIG. 6 in that, in the method of FIG. 7, manipulating 608 the data 607 to obtain the resource 609 includes at least one of decompressing the data 702, decrypting the data 704, or tiling the data 706. Decompressing the data 702 may be carried out by the process accelerator 601 by way of a compute unit of the process accelerator or separate engine for decompressing data. Decrypting the data 702 may be carried out by the process accelerator 601 by way of a compute unit of the process accelerator or separate engine for decompressing data. Tiling the data 702 may be carried out by the process accelerator 601 by way of a compute unit of the process accelerator or separate engine for decompressing data. One of ordinary skill in the art will recognize that the data manipulation may be performed in series, such as the output of one manipulation may be the input to another manipulation. For example, the data may be decrypted, then decompressed, and then tiled to obtain the resource.

In view of the explanations set forth above, readers will recognize that the benefits of transferring data include:
- Support for the NVM fast load/decompress content/data infrastructure using existing API structure and compatible extensions.
- Active leverage of RAID configurations of storage for scaling content load bandwidth
- Leveraging storage DMA directly to process accelerator device memory using Smart Access Memory/resizable BAR (eliminating several copy/staging buffer steps in conventional data transfer designs)
- Coalesced decompression/decryption optimization path, improving access latency/performance.
- Process accelerator feedback path to trigger dynamic load of content from backend NVM storage directly into process accelerator memory, improved performance, application experience allowing larger, more sophisticated datasets, requiring little host involvement to reload data sections.

Exemplary embodiments of the present disclosure are described largely in the context of a fully functional computer system for transferring data from NVM to a process accelerator. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, or a computer program product. The computer program product can include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can include copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatus (systems), and computer program products according to embodiments of the disclosure. It will be understood that each block of the flowchart illustrations or block diagrams, and combinations of blocks in the flowchart illustrations or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein includes an article of manufacture including instructions which implement aspects of the function/act specified in the flowchart or block diagram block or blocks.

The computer readable program instructions can also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method comprising:
issuing, by a process accelerator to a dispatch queue of a host, a transfer request for a resource at a host file system, wherein the host file system stores data that is least one of an encrypted form of the resource, a compressed form of the resource, or a tile form of the resource, wherein a file system call identifying the resource in the host file system is received by a host file system driver from an application, and wherein a target physical location in a processor accelerator memory for receiving the data is identified by the host file system driver from the transfer request in the dispatch queue;

receiving, by the process accelerator responsive to the transfer request, the data corresponding to the resource from the host file system, wherein the process accelerator receives the data from the host file system bypassing staging memory of the host; and manipulating, by the process accelerator, the data received from the host file system to obtain the resource including at least one of decompressing the data, decrypting the data, or tiling the data.

2. The method of claim 1, wherein the transfer request comprises location data for accessing the data, size data indicating a transfer size of the data, compression data indicating a compression type of the data, and target data indicating a target resource of the process accelerator.

3. The method of claim 1, wherein the process accelerator is one of a graphics accelerator, or a machine learning accelerator.

4. The method of claim 1, wherein the process accelerator receives the data from the host file system by way of a direct memory transfer.

5. The method of claim 1, wherein the dispatch queue comprises a lock-free dispatch queue with atomically incremented write and read indices.

6. The method of claim 1, wherein the host file system is a redundant array of independent disks.

7. The method of claim 1, wherein the transfer request indicates a target physical location in a processor accelerator memory for receiving the data.

8. An apparatus comprising:
 a processor;
 system memory including staging memory;
 non-volatile memory including a host file system; and
 a process accelerator operatively coupled to the processor, the process accelerator including one or more processing cores, process accelerator memory, and a data compression engine, the process accelerator configured to:
  issue a transfer request for a resource at the host file system to a dispatch queue of a host, wherein the host file system stores data that is least one of an encrypted form of the resource, a compressed form of the resource, or a tile form of the resource, wherein a file system call identifying the resource in the host file system is received by a host file system driver from an application, and wherein a target physical location in a processor accelerator memory for receiving the data is identified by the host file system driver from the transfer request in the dispatch queue;
  receive, responsive to the transfer request for the resource, the data corresponding to the resource from the host file system, wherein the process accelerator receives the data from the host file system bypassing the staging memory; and
  manipulate the data received from the host file system to obtain the resource including at least one of decompressing the data, decrypting the data, or tiling the data.

9. The apparatus of claim 8, wherein the transfer request comprises location data for accessing the data, size data indicating a transfer size of the data, compression data indicating a compression type of the data, and target data indicating a target resource of the process accelerator.

10. The apparatus of claim 8, wherein the process accelerator is one of a graphics accelerator or a machine learning accelerator.

11. The apparatus of claim 8, wherein the process accelerator receives the data from the host file system by way of a direct memory transfer.

12. The apparatus of claim 8, wherein the dispatch queue comprises a lock-free dispatch queue with atomically incremented write and read indices.

13. The apparatus of claim 8, wherein the host file system is a redundant array of independent disks.

14. The apparatus of claim 8, wherein the transfer request indicates a target physical location in a processor accelerator memory for receiving the data.

15. A computer program product disposed upon a non-transitory computer readable medium, the computer program product comprising computer program instructions for transferring data from non-volatile memory to process accelerator memory that, when executed, cause a computer system to:
 issuing, by a process accelerator to a dispatch queue of a host, a transfer request for a resource at a host file system, wherein the host file system stores data that is least one of an encrypted form of the resource, a compressed form of the resource, or a tile form of the resource, wherein a file system call identifying the resource in the host file system is received by a host file system driver from an application, and wherein a target physical location in a processor accelerator memory for receiving the data is identified by the host file system driver from the transfer request in the dispatch queue;
 receiving, by the process accelerator responsive to the transfer request, the data corresponding to the resource from the host file system, wherein the process accelerator receives the data from the host file system bypassing staging memory of the host; and
 manipulating, by the process accelerator, the data received from the host file system to obtain the resource including at least one of decompressing the data, decrypting the data, or tiling the data.

16. The computer program product of claim 15, wherein the transfer request comprises location data for accessing the data, size data indicating a transfer size of the data, compression data indicating a compression type of the data, and target data indicating a target resource of the process accelerator.

17. The computer program product of claim 15, wherein the transfer request indicates a target physical location in a processor accelerator memory for receiving the data.

* * * * *